United States Patent [11] 3,630,528

[72] Inventor Itsuki Ban
829, Higashi-Oizumimachi, Nerima-ku,
Tokyo-to, Japan
[21] Appl. No. 242
[22] Filed Jan. 2, 1970
[45] Patented Dec. 28, 1971
[32] Priorities Japan, Jan. 1, 1969, 44/2442, May 8, 1969, 44/41578

[54] TAPE-CARTRIDGE-POSITIONING APPARATUS

8 Claims, 3 Drawing Figs.

[52] U.S. Cl. 274/4 B
[51] Int. Cl. G11b
[50] Field of Search 274/4 B, 4 C, 11 B; 179/100.2 Z

[56] References Cited
UNITED STATES PATENTS
2,868,891 1/1959 Brewster 274/4 E
3,126,162 3/1964 MacKenzie 274/4 F

*Primary Examiner*—Harry N. Haroian
*Attorney*—Jacobs and Jacobs

ABSTRACT: A tape-cartridge-positioning apparatus for an endless magnetic tape cartridge player, comprising a reciprocating lever member slidably supported on a deck within a player housing and biased in one direction by a tension spring, an electromagnetic device for holding the reciprocating lever in a first position against the bias of the tension spring, and a control circuit for the electromagnetic device.

The control circuit includes at least one electrical switch operable in relation to manual insertion of the tape cartridge in a predetermined position in the player housing. The electromagnetic device releases hold of the reciprocating lever in relation to operation of the electrical switch whereby the reciprocating lever is moved from the first position to a second position by the bias of the tension spring. When the reciprocating lever is moved from the first position to the second position, the cartridge is moved and positioned in the playing position as a portion of the reciprocating lever urges the rear edge of the cartridge.

TAPE-CARTRIDGE-POSITIONING APPARATUS

BACKGROUND OF THE INVENTION This invention relates to an endless magnetic tape cartridge player, and more particularly to a novel tape cartridge positioning apparatus for positioning an endless magnetic tape cartridge insertable in the player in the "play" position. Proposal has been made heretofore to provide a method for inserting the tape in the tape cartridge player and for positioning the same in the play position. One of the methods relies on the use of an engaging portion such as a notch formed in a sidewall of the tape cartridge and is such that the cartridge which is inserted through an opening in the player housing in the player housing is located in the playing position when an engaging member formed of a retention roller provided on a free end of a leaf spring of which one end is fixed to the deck in the player housing is entered in the notch. In this case, the retention roller presses the inclined wall of the notch under the bias of the leaf spring. This causes the relative position of the cartridge to the magnetic head and the rotary capstan located on the deck to be improper if the retention roller is positioned inadequate or the bias of the leaf spring improper. For this reason, the endless magnetic tape in the cartridge is allowed to be transported at unstable speed to generate wow flatter or deteriorate tone quality. It follows that the retention roller should be provided with strict accuracy. Further, the cartridge to be played is limited to such that it should be provided with a certain notch in a certain position. This will hinder convertibility of the cartridge thereby causing inconvenient of the user.

In the conventional endless magnetic tape cartridge player, the cartridge is longitudinally inserted in the player housing through the opening in the housing and is held in the playing position. For this reason, the magnetic head against which the endless magnetic tape within the cartridge abuts is caused to be located in the inmost position in the player housing. This causes much trouble about cleaning of the magnetic head and related parts. Thus, a particular tool or the like is required to clean the magnetic head and related parts. The inventor has succeeded in obtaining a novel tape-cartridge-positioning apparatus by which all defects derived from the use of the prior apparatus for positioning the tape cartridge in the playing position.

SUMMARY OF THE INVENTION

It is a primary object of the present invention to provide a tape-cartridge-positioning apparatus for an endless magnetic tape cartridge player, which is capable of positioning the tape cartridge in the playing position without employing an engaging portion such as notch or the like formed on the cartridge.

Another object of the invention is to provide a tape-cartridge-positioning apparatus for an endless magnetic tape cartridge player, which enables the cartridge to be transversely inserted through an opening in the player housing into the player prior to the positioning of the cartridge in the playing position.

Another object of the invention is to provide a tape-cartridge-positioning apparatus for an endless magnetic tape cartridge player, wherein a reciprocating level member slidably provided on the deck in the player housing in the direction perpendicular to the direction in which the cartridge is inserted is automatically disengaged from its retention in relation to insertion of the cartridge in the player and is moved by the bias of a tension spring, the tape cartridge is moved to the playing position as the rear edge of the cartridge is urged by the arm of the lever member when moved.

Another object of the invention is to provide a tape-cartridge-positioning apparatus for an endless magnetic tape cartridge player, wherein abutment between a pinch roller within the cartridge and a rotary capstan for drivingly feeding the magnetic tape is maintained by the bias of the tension spring thereby positioning the cartridge in the playing position.

Another object of the invention is to provide a tape-cartridge-positioning apparatus for an endless magnetic tape cartridge player, wherein the lever member is retained against the bias of the tension spring by means of an electromagnetic device, the electromagnetic device has a control circuit includes at least one switch operable in relation to insertion of the tape cartridge, the electromagnetic device releasing retention of the lever member in response to operation of the switch.

Another object of the invention is to provide a tape-cartridge-positioning apparatus for an endless magnetic tape cartridge player, wherein the cartridge is forced out to the direction in which an opening provided in the player housing as the side edge of the cartridge is automatically and elastically pressed when the tape cartridge is moved from the playing position to the nonplaying position.

According to the invention, there is the advantage that a cleaning of the magnetic head is readily effected since the tape cartridge is adapted to be transversely inserted so that the magnetic head could be located adjacent the opening in the player housing.

For a fuller understanding of the nature and objects of the invention, reference should be had to the following detailed description taken in conjunction with accompanying drawing wherein:

DESCRIPTION OF THE PREFERRED EMBODIMENTS

Figure 1:
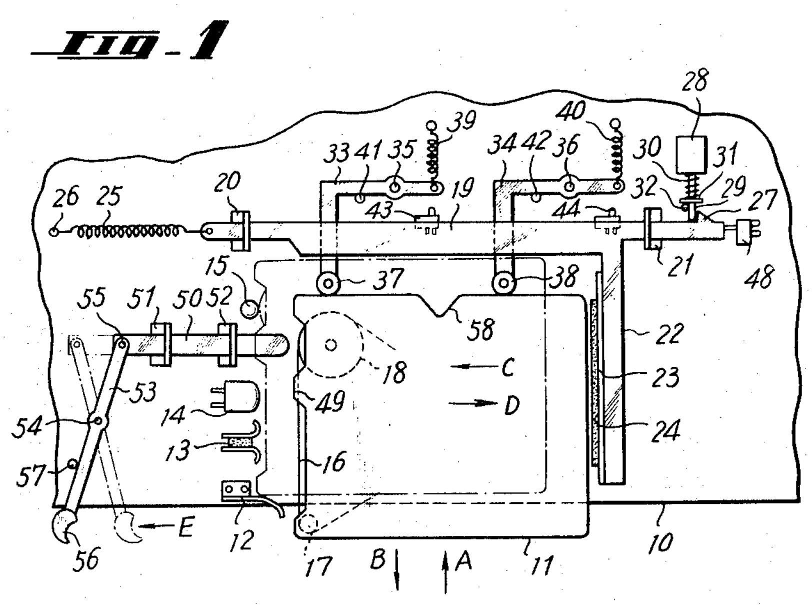
FIG. 1 is a representation schematically showing one embodiment of a tape-cartridge-positioning apparatus according to the present invention.

In FIG. 1, numeral 10 is a horizontal deck which is provided within a housing (not shown) for an endless magnetic tape cartridge player and on which is mounted an endless magnetic tape cartridge 11 inserted for play into an opening (not shown) formed in the housing, and a tape-cartridge-positioning apparatus, as will be detailed later, according to the invention. In a conventional endless magnetic tape cartridge player, the tape cartridge to be played is adapted to be longitudinally inserted in the player housing, however, the present invention provides such a tape cartridge which is transversely inserted in the housing in relation to the longitudinal axis of the cartridge. To this end, the opening in the player housing (not shown) is of dimension so that the cartridge 11 may be transversely inserted in the housing and in an elongated form.

Much of the mechanism disposed beneath the deck 10 is omitted since it forms no part of the present invention. However, there shown on the deck 10 are a guide member 12 for the cartridge, an endmark detection or search means 13, a magnetic head 14, and a rotational capstan 15. The capstan 15 is drivingly rotated by an electrical motor (not shown).

The tape cartridge 11 includes a generally rectangular housing with a centrally disposed reel assembly (not shown) on which an endless magnetic tape 16 is wound and unwound in conventional manner. The endless tape 16 passes over a guide 17 and pinch roller 18. The guide 17 and pinch roller 18 are disposed adjacent the leading edge of the cartridge whereat the cartridge sidewall is cut away or disposed with and the tape 16 is extended from the center of the hub of the reel (not shown) about the guide 17 and thence about the pinch roller 18 back to the outer periphery of a roll formed by the tape wound about the hub.

The tape-cartridge-positioning apparatus according to the present invention includes a reciprocating lever member 19 slidably supported by guides 20 and 21 fixed to the deck 10. The lever member 19 is provided for moving the cartridge 11 which is inserted in the player housing from the direction of arrow A and is laid on the deck 10 toward the "play" position where the pinch roller 18 within the cartridge abuts against the capstan 15. The lever member 19 is provided with an arm 22 which projects from one portion thereof and which has a bending portion 23 carrying a pushing member of rubber sheet or like attached thereto.

A comparatively heavy tension spring 25 is interposed between an one end portion of the lever member 19 and a pin 26 mounted on the deck 10 to normally urge the lever member in the leftward direction. Movement of the lever member 19 by the bias of the tension spring 25 is prevented by a hook portion 27 formed of the lever member when the hook portion engages the tip end of an actuator 29 of an electromagnetic plunger 28. This allows the lever member to be normally positioned in a first position as shown in FIG. 1. When the plunger 28 is energized, as will be detailed later, the actuator 29 is attracted against the bias of a spring 30 to release engagement of the hook portion 27 with the actuator 29. On the other hand, when the plunger 28 is deenergized, the actuator 29 is returned by the bias of the spring 30 to a position where a member 31 on the actuator abut against a stopper pin 32 on the deck 10. The details of a control circuit of the plunger 28 will be later described.

Figure 2:
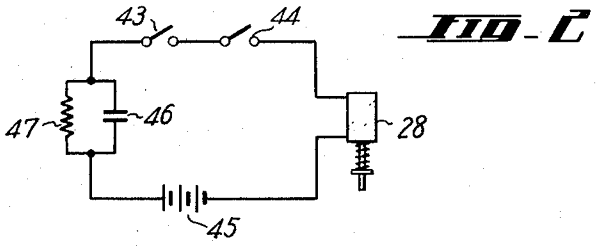
FIG. 2 is a diagram showing a control circuit for the electromagnetic plunger in FIG. 1.

Two L-shaped actuating levers 33 and 34 are spaced from each other and slidable mounted by shafts 35, 36 to the deck 10. The levers 33 and 34 includes at one ends thereof associated rollers 37, 38 and each is given counterclockwise rotational force by springs 39, 40. This counterclockwise rotational force is controlled by stopper pins 41, 42. The levers 33, 34 are caused to be swing against the bias of the associated springs 39, 40 as the side edge of the cartridge 11 when inserted in the direction of arrow A abuts against and urges the rollers 37, 38. The rollers 37, 38 are each relatively in a flattened form and entered into a clearance between the lever member 19 and the deck 10 when the cartridge 11 is inserted to the extent close to the lever member 19. Normally opened switches 43, 44 are rigidly mounted to the deck 10 and adapted to be actuated by the actuating levers 33, 34. The switches 43, 44 are, when the cartridge 11 is inserted to the extent close to the lever member 19, operated by the lever 33, 34 and thus closed. As shown in FIG. 2, the switches 43, 44 are provided in the control circuit. The control circuit is constituted so that the plunger 28 and switches 43, 44 are connected in series with an electrical source 45 for the plunger 28 and a capacitor 46 and a high resistor 47 are also connected in parallel to the electrical source 45.

FIG. 1 shows that the cartridge 11 passes through the opening in the player housing (not shown) and is partially inserted in the housing. When this cartridge is further inserted in the direction of arrow A, the levers 33, 34 are clockwise rotated. The cartridge is then inserted to the extend close to the lever member 19 to allow the levers 33, 34 to operate and close the switches 43, 44. Upon closing the switches 43, 44, the heavy current from the electrical source 45 is applied to an exciting coil of the plunger. Thus, the actuator 29 of the plunger 28 is attracted to a position for being disengaged from the hook portion 27 of the lever member 19. As a result, the lever member 19 is slidably moved leftward by the bias of the tension spring 25. With leftward movement of the lever member 19, the pushing member 24 urges the rear edge of the cartridge 11 and the cartridge is thereby moved in the direction of arrow C with being guided by the guide member 12 on the deck 20. When the cartridge 11 is moved to a position indicated by the dot-and-dash line and the pinch roller 18 in the cartridge abuts against the capstan 15 to suspend movement of the cartridge 11 and of the lever member 19. In this manner, the cartridge 11 is disposed in the playing position. The cartridge 11 held in the playing position is biased as the rear edge thereof is pushed by the lever member 19 by the bias of the tension spring 25 to obtain abutment force derived from the pinch roller 18 and the capstan 15. In response to movement of the lever member 19 from the first position, an electrical switch 48 mounted on the deck 10 is closed. The switch 48 is actuated and opened by the lever member 19 when the lever member is in the first position. Relative to the closing of the switch 48, the motor (not shown) for rotatably driving the capstan 15 is energized to rotate the capstan 15. Accordingly, the cartridge 11 held in the playing position allows the tape 16 to be drivingly fed by the capstan 15 and the pinch roller 18. The switches 43, 44 are kept closed so long as the cartridge 11 is held in the playing position, and the current from the electrical source 45 applied to the exciting coil of the plunger 28 is converted to the weak current through the high resistor 47 after the capacitor 46 has been charged with the current. And, the actuator 29 of the plunger 28 is returned to its original position by the bias of the spring 30.

A mechanism or device for breaking off the play of the cartridge 11 includes a return arm 50 and a return lever 53. The return arm 50 is slidably mounted by the guides 51, 52 to the deck 10 and has one end in a contact connection with one portion 49 of the cartridge front edge held in the "play" position. The return lever 53 is swingably pivoted to a pin 54 mounted to the deck 10 and has the rear end connected through a connecting pin 55 to the arm 50 at the other end thereof. The return lever 53 passes through a slit (not shown) formed in the player housing (not shown) to allow its one end to project forwardly of the housing. A knob 56 which may be grasped with a finger for moving the return arm is mounted to the return lever 53 at one end thereof. It should be noted that the arm 50 and the lever 53 are maintained in a position shown by the dot-and-dash line when the cartridge 11 is located in the "-play" position.

Now, the knob 56 is moved by means of the finger in the direction of arrow E and the return lever 53 is clockwise rotated to a position shown by the solid line, where it abuts against a stopper pin 57 on the deck 10, the arm 50 is thus rightwardly slided and moved to a position shown by the solid line. With rightward movement of the return arm 50, the cartridge 11 is moved back in the direction of arrow D and away from the playing position as the one portion of the cartridge is forced by the one end of the return arm 50. At the same time, the lever member 19 is caused to be moved against the bias of the tension spring 25. When the return lever 53 is moved to abut against the stopper pin 57, the lever member 19 is returned to the first position and the hook portion 27 engages the actuator 29 of the plunger 28 to retain the lever member 19 in the first position. After the lever member 19 has been returned to the first position, the knob 56 is allowed to be free from the finger to release abutment force derived from the return lever 50 at one end thereof and the one portion 49 of the cartridge 11 and the cartridge 11 is moved in the direction of arrow B as the side edge thereof is depressed by the levers 33, 34 which are rotatably returned by the bias of the springs 39, 40. As the return levers 33, 34 are returned to their initial positions, the switches 43, 44 are opened thereby not applying the current to the exciting coil of the plunger 28. The charge on the capacitor 46 is discharged through the high resistor 47. On the other hand, the lever member 19 is returned to the first position and the switch 48 is actuated and opened by the lever member 19. In relation to the opening of the switch, rotation of the capstan is thus suspended.

Although the control circuit of the plunger 28 is provided with two switches 43, 44, it may be enough to provide either one of them. Advantage derived from the use of two switches is that either one of them could be opened even if the cartridge 11 is slantly disposed by insertion in the direction of arrow A. Therefore, the lever member 19 is retained in the first position by the plunger 28. In other words, the plunger 28 is not energized unless the cartridge 11 is properly inserted in the direction of arrow A. Stated otherwise, the plunger 28 is energized to release retention of the lever member 19 for moving the cartridge 11 in the direction of arrow C only when the cartridge 11 is precisely inserted to a predetermined position.

As described above, according to the tape-cartridge-positioning apparatus of the present invention, convertibility of the cartridge to be played may be improved since a particular engaging portion such as a notch 58 or the like is not required for positioning the cartridge. Further, since the cartridge 11 is transversely inserted to enable the magnetic head 14 to locate in proximity of the opening in the housing (not shown) to readily clean the magnetic head.

Figure 3:
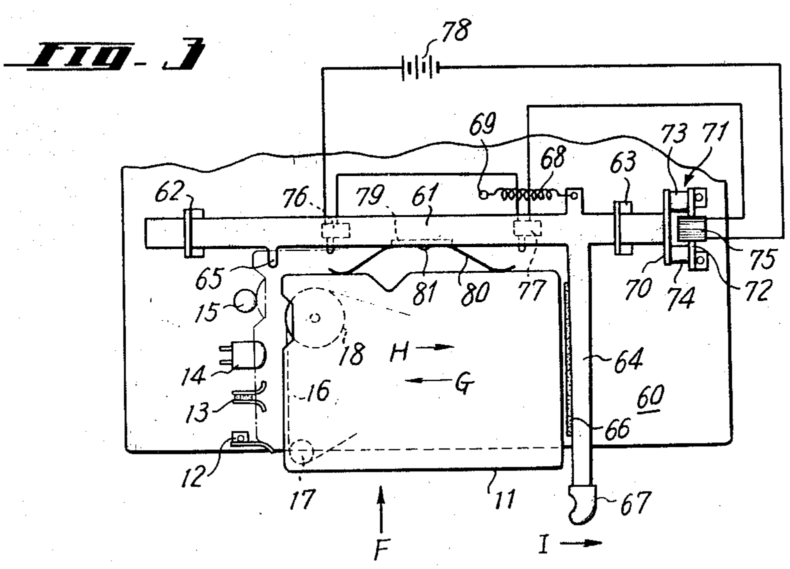
FIG. 3 is an explanatory view of another embodiment of the tape-cartridge-positioning apparatus according to the present invention.

FIG. 3 shows alternative embodiment of the tape-cartridge-positioning apparatus according to the present invention, in which similar numerals are used to illustrate like parts in FIG. 1.

A reciprocating lever member 61 is reciprocally and slidably mounted by guides 62, 63 to a deck 60 and includes a relatively longer rear arm 64 and a relatively shorter front arm 65. A pushing member 66 of rubber sheet is disposed on the rear arm 64 at one side thereof. The rear arm 64 and the front arm 65 are substantially parallel to each other. The cartridge 11 which is inserted through the opening in the player housing (not shown) in the direction of arrow F is interposed between the arms 64, 65. The rear arm 64 passes through the opening (not shown) formed in the housing (not shown) to allow the one end of the arm to project forwardly of the housing. A knob 67 which may be grasped with a finger for moving the lever member 61 is mounted to the rear arm 64 at one end thereof.

A comparatively heavy tension spring 68 is provided between the lever member 61 and a pin 69 mounted to the deck 60. The lever member is given the leftward movement force. The lever member 19 is normally retained in a first position as shown in FIG. 3 by attraction of a magnetic piece 70 to an electromagnetic device 71. The magnetic piece 70 is of mild steel and fixed to the lever member 61 at one end thereof. The electromagnetic device 71 comprises a core 72, two permanent magnets 73, 74, and a coil 75 wound to the core. When the lever member 61 is in the first position, the magnetic piece 70 is attracted to the permanent magnets 73, 74 of the electromagnetic device 71. The coil 75 is connected through the switches 76, 77 on the deck 60 to an electrical source 78. The switches 76, 77 are normally opened but operated and closed by the side edge of the cartridge 11 inserted in the direction of arrow A. As the switches 76, 77 are closed, the current is applied from the source 78 to the coil 75 to generate the magnetic flux. The direction of the current drained to the coil 75 is previously determined so as to allow the magnetic flux generated from the coil 75 to cancel the magnetic flux of the permanent magnets 73, 74. Thus, generation of the magnetic flux from the coil 75 loses the attractive force of the electromagnetic device 71 to the magnetic piece 70. A leaf spring 80 is at a center portion thereof mounted by a fixed pin 81 to a bending portion of the lever member 61. The mode of operation of the leaf spring 80 will be described in details later.

The following description related to the mode of operation of the tape-cartridge-positioning apparatus in FIG. 3.

The cartridge 11 pressedly inserted in the direction of arrow F with the finger, is further inserted against the bias of the leaf spring 80, and the switches 76, 77 are thus actuated and closed by the side edge of the cartridge 11. Simultaneously with the closing of the switches 76, 77, the attractive force of the electromagnetic device 71 to the magnetic piece 70 is lost to move the lever member 61 in the leftward direction by the bias of the tension spring 68. With leftward movement of the lever member 61, the pushing member 66 depresses the rear edge of the cartridge 11 thereby moving the cartridge in the direction of arrow G with being guided by the guide member 12. The cartridge 11 is moved to a position shown by the dot and dash line and the pinch roller 18 in the cartridge 11 abuts against the capstan 25 so that movement of the lever member 61 and of the cartridge 11 by the tension spring 68 is suspended to retain the lever member 61 in a second position. While the lever member 61 has been moved to the second position, the cartridge is such that abutment between the pinch roller 18 and the capstan 15 is maintained by the bias of the tension spring 68 and whereby the relative position of the cartridge 11 to the capstan 15, the magnetic head 14 is immovably ensured by those members such as the lever member 29, the guide member 12 and the leaf spring 80 thereby positioning the cartridge in the "playay" position in a precise manner.

Now, in order to move the cartridge to be played from the "play" to "nonplay" position, the knob 67 is moved with the finger in the direction of arrow I to allow the lever member 61 to be moved from the second position to the rightward direction against the bias of the tension spring 68. With rightward movement of the lever member 61, the front arm 65 urges the front edge of the cartridge 25 to thereby move the cartridge 11 from "play" position to the direction of arrow H. As the lever member 61 is moved to the first position, the cartridge 11 is forced out to a position indicated the solid line by the returning bias of the leaf spring 80 and the switches 76, 77 are opened. Accordingly, the lever member 61 is retained in the first position when the magnetic piece 70 is attracted to the electromagnetic device 71. It will be readily understood that the cartridge 11 forced out to the position shown by the solid line by the leaf spring 80 is again depressed in the direction of arrow F to allow the cartridge 11 to be automatically moved from the "nonplay" to "play" position.

The invention and its attendant advantages will be understood from the foregoing description. It is to be understood that change and variations may be made without departing from the spirit and scope of the invention as defined in the appended claims.

What is claimed is:

1. A tape-cartridge-positioning apparatus for an endless magnetic tape cartridge player, the player having a housing provided with tape driving means including a rotary capstan for drivingly feeding an endless magnetic tape in the cartridge in cooperation with a pinch roller within the cartridge and a tape-reproducing circuit including a magnetic head, the tape cartridge being transversely inserted through an opening in the housing thereinto, comprising:

a deck provided within said housing and carrying said capstan and said magnetic head on said deck, said cartridge transversely inserted through said opening in said housing being laid on said deck; a reciprocating lever member slidably provided on said deck in the direction perpendicular to the direction in which said cartridge is inserted, said lever member having an arm opposed to the rear edge of said cartridge inserted in said housing; a tension spring urging said reciprocating lever member in one direction;

an electromagnetic means provided on said deck for preventing movement of said reciprocating lever member by said tension spring, said reciprocating lever member being normally retained in a first position by said electromagnetic means where said rear edge of said cartridge insertable in said housing may be opposed to the arm of said lever member; a control circuit for said electromagnetic means, said control circuit having at least one switch which is closed in relation to insertion of said cartridge to a position in proximity of said lever member.

said electromagnetic means releasing retention of said lever member in response to the closing of said switch, said lever member being moved from said first position by the bias of said tension spring at the same time when said electromagnetic means releases retention of said lever member, said cartridge being moved to a position, as said rear edge of said cartridge is urged by said arm with movement of said lever member, where said pinch roller within said cartridge abuts against said capstan, said cartridge being moved and located to said playing position as said rear edge of said cartridge is continuously urged by said arm by the bias of said tension spring; return means for returning said cartridge held in said playing position to a nonplaying position against the bias of said tension spring, said cartridge being returned to said nonplaying position by said return means while said lever member is retained in said first position by said electromagnetic means.

2. A tape-cartridge-positioning apparatus for an endless magnetic tape cartridge player in accordance with claim 1, wherein said electromagnetic means is an electromagnetic plunger having an actuator of which one end engages a hook portion formed of said reciprocating lever member, said lever member being retained in said first position by engagement of said actuator with said hook portion, said engagement of said actuator with said hook portion being released when said electromagnetic plunger is energized by said control circuit thereby releasing retention of said lever member.

3. A tape-cartridge-positioning apparatus for an endless magnetic tape cartridge player in accordance with claim 2, wherein said switch for said control circuit is slidably mounted on said deck so as to be opposed to a swing lever which is given a rotational force by a spring, said swing lever being normally biased by said spring in the direction away from said switch and urged by said side edge of said cartridge inserted in said player housing and thus being rotated against the bias of said spring thereby actuating said switch.

4. A tape-cartridge-positioning apparatus for an endless magnetic tape cartridge player in accordance with claim 1, wherein said return means comprises a return arm slidably mounted on said deck, a return lever swingably provided on said deck and having one end connected to said return arm and the other end projecting outwardly of said player housing with the other end being provided with a knob fixed thereto, said one end of said return arm being opposed to said front edge of said cartridge held in said playing position, said return arm being slided with depressing said front edge of said cartridge by manually swinging said return lever through said knob thereby moving back said cartridge.

5. A tape-cartridge-positioning apparatus for an endless magnetic tape cartridge player in accordance with claim 1, wherein said electromagnetic means comprises a core rigidly mounted to said deck, a coil wound to said core, and at least one permanent magnet fixed to said core, said lever member being normally retained in said first position by attraction of a magnetic piece provided on said reciprocating lever member with said permanent magnet, the magnetic flux generated from said coil by applying the current to said coil by said control circuit cancels the magnetic flux of said permanent magnet thereby releasing retention of said lever member.

6. A tape-cartridge-positioning apparatus for an endless magnetic tape cartridge player in accordance with claim 5, wherein said switch for said control circuit is rigidly mounted to said deck and is operated and closed by said side edge of said cartridge inserted in a position in proximity of said reciprocating lever member.

7. A tape-cartridge-positioning apparatus for an endless magnetic tape cartridge player in accordance with claim 1, wherein the one end of said arm of said reciprocating lever member projects outwardly of said player housing and is provided a knob, a front arm is parallel to said arm and provided on said lever member, said front arm being engaged by said front edge of said cartridge by manually moving said lever member through said knob against the bias of said tension spring thereby moving said cartridge from said playing position to said nonplaying position.

8. A tape-cartridge-positioning apparatus for an endless magnetic tape cartridge player in accordance with claim 6, wherein a leaf spring is provided on said reciprocating lever member, said cartridge which is moved from the playing position to the nonplaying position is forced out in the direction away from said lever member as said side edge of said cartridge is urged by the bias of said leaf spring.

* * * * *